(12) United States Patent
Oya

(10) Patent No.: US 10,313,627 B2
(45) Date of Patent: Jun. 4, 2019

(54) APPARATUS FOR PLAYING BACK RECORDED VIDEO IMAGES RELATED TO EVENT, AND METHOD THEREOF

(71) Applicant: CANON KABUSHIKI KAISHA, Tokyo (JP)

(72) Inventor: Takashi Oya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 15/210,717

(22) Filed: Jul. 14, 2016

(65) Prior Publication Data

US 2016/0323536 A1 Nov. 3, 2016

Related U.S. Application Data

(63) Continuation of application No. 12/763,897, filed on Apr. 20, 2010, now Pat. No. 9,420,239.

(30) Foreign Application Priority Data

Apr. 23, 2009 (JP) ................................. 2009-105560

(51) Int. Cl.
*G06K 9/00* (2006.01)
*H04N 5/76* (2006.01)
*H04N 5/91* (2006.01)
*H04N 7/18* (2006.01)
*G11B 27/10* (2006.01)
*H04N 21/44* (2011.01)
*H04N 21/2743* (2011.01)
*H04N 21/2747* (2011.01)
*H04N 21/4223* (2011.01)

(52) U.S. Cl.
CPC ........... *H04N 5/91* (2013.01); *G06K 9/00771* (2013.01); *G11B 27/10* (2013.01); *H04N 5/76* (2013.01); *H04N 7/185* (2013.01); *H04N 21/2743* (2013.01); *H04N 21/2747* (2013.01); *H04N 21/4223* (2013.01); *H04N 21/44008* (2013.01)

(58) Field of Classification Search
None
See application file for complete search history.

(56) References Cited

U.S. PATENT DOCUMENTS

| 6,144,375 A | 11/2000 | Jain | |
| 2004/0240542 A1* | 12/2004 | Yeredor | G06K 9/00771 375/240.01 |
| 2005/0185823 A1 | 8/2005 | Brown | |
| 2006/0279628 A1 | 12/2006 | Fleming | |

FOREIGN PATENT DOCUMENTS

JP 2007-505523 T 3/2007
JP 2007-243342 A 9/2007

* cited by examiner

*Primary Examiner* — Scott B Christensen
(74) *Attorney, Agent, or Firm* — Canon U.S.A., Inc. IP Division

(57) ABSTRACT

An apparatus includes a recording unit configured to record a video image, a generation unit configured to generate, when a first type of event in which a state of an object changes is detected from the video image, an index associating the first type and a second type of event related to the first type in the video image, and a playback unit configured to play back, when the first type is specified, a video image concerning the second type corresponding to the specified first type based on the index.

18 Claims, 15 Drawing Sheets

FIG. 4

EVENT INFORMATION

| EVENT ID | OCCURRENCE DATE/TIME | TYPE | PRIORITY | DEVICE ID | OBJECT ID | DETAIL |
|---|---|---|---|---|---|---|
| ... | ... | ... | ... | ... | ... | ... |
| 00123 | 2008/01/01 13:00:45 | SYSTEM | LOW | Cam01 | N/A | RECORDING START |
| 00124 | 2008/01/01 13:00:45 | ABNORMALITY DETECTION | MEDIUM | Cam01 | N/A | EXTERNAL INPUT 1 ON |
| 00125 | 2008/01/01 13:10:50 | ABNORMALITY DETECTION | MEDIUM | Cam01 | N/A | EXTERNAL INPUT 1 OFF |
| 00126 | 2008/01/01 13:12:24 | ABNORMALITY DETECTION | LOW | Cam01 | 001 | OBJECT APPEARANCE |
| 00127 | 2008/01/01 13:13:48 | ABNORMALITY DETECTION | LOW | Cam01 | 002 | OBJECT APPEARANCE |
| 00128 | 2008/01/01 13:14:18 | ABNORMALITY DETECTION | HIGH | Cam01 | 002 | STANDING-STILL DETECTION ON |
| 00129 | 2008/01/01 13:14:27 | ABNORMALITY DETECTION | LOW | Cam01 | 001 | OBJECT EXIT |
| 00130 | 2008/01/01 13:16:10 | SYSTEM | LOW | Cam01 | ... | RECORDING STOP |
| ... | ... | ... | ... | ... | ... | ... |
| 00200 | 2008/01/01 07:35:24 | SYSTEM | HIGH | Cam01 | ... | INSUFFICIENT DISK CAPACITY |
| ... | ... | ... | ... | ... | ... | ... |

FIG. 7

PLAYBACK INDEX INFORMATION

| ATTENTION EVENT ID | COMMENTS | | |
|---|---|---|---|
| 00128 | OBJECT 002 STANDING-STILL DETECTION ON | | |
| RELATED EVENT ID | COMMENTS | | |
| 00126 | OBJECT 001 APPEARANCE | | |
| 00127 | OBJECT 002 APPEARANCE | | |
| OPERATION INFORMATION | | | |
| OPERATION | CAMERA ID | TIME | RELATED EVENT ID |
| Start | Cam01 | 2008/01/01 13:12:20 | 00126 |
| Stop | Cam01 | 2008/01/01 13:12:28 | 00126 |
| Start | Cam01 | 2008/01/01 13:13:44 | 00127 |
| Stop | Cam01 | 2008/01/01 13:13:52 | 00127 |

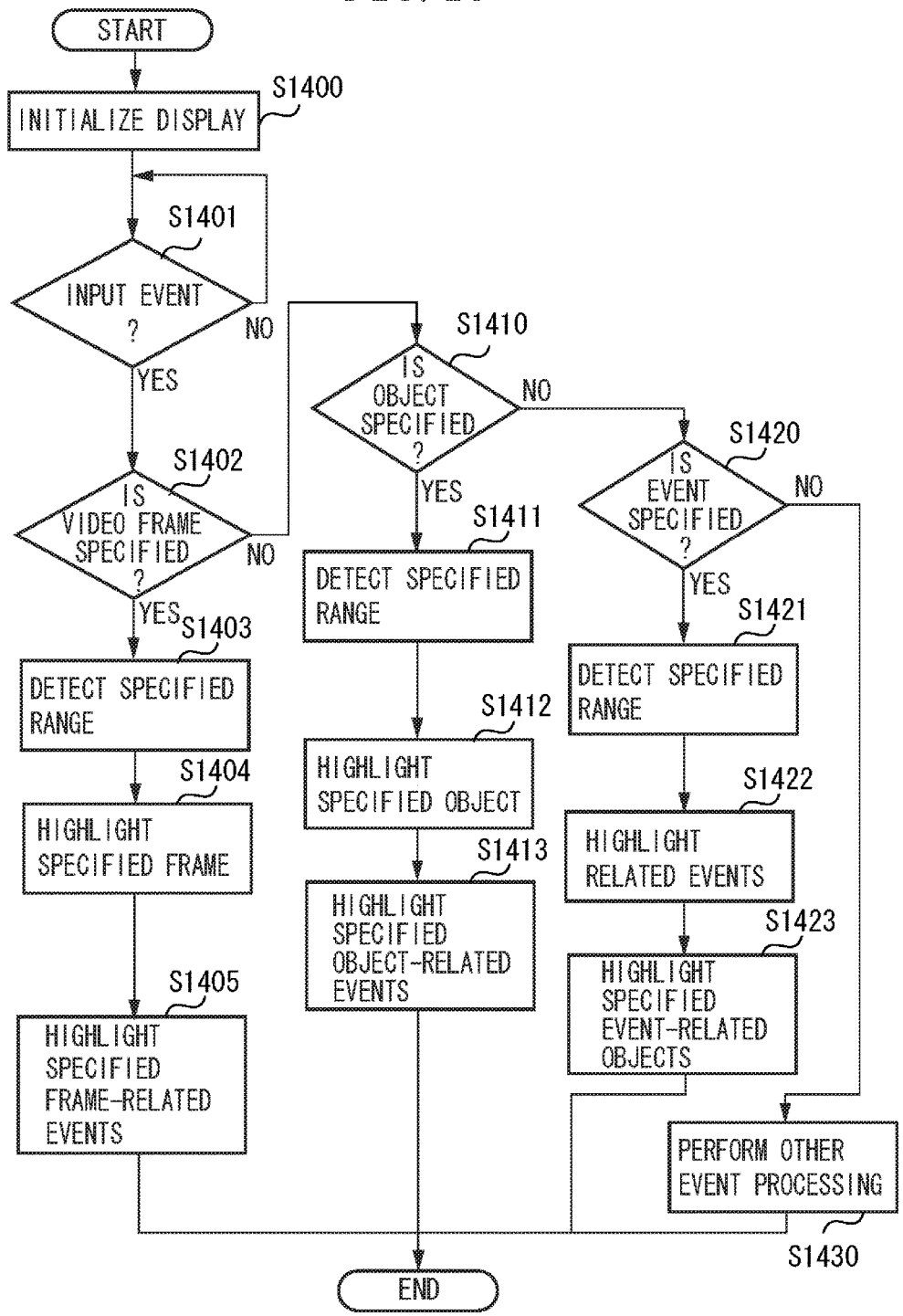

APPARATUS FOR PLAYING BACK RECORDED VIDEO IMAGES RELATED TO EVENT, AND METHOD THEREOF

CROSS-REFERENCE TO RELATED APPLICATION

This application is a Continuation of U.S. application Ser. No. 12/763,897, filed Apr. 20, 2010, which claims priority from Japanese Patent Application No. 2009-105560 filed Apr. 23, 2009, which are hereby incorporated by reference herein in their entireties.

BACKGROUND OF THE INVENTION

Field of the Invention

The present invention relates to an apparatus for playing back recorded video images related to an event and a method thereof.

Description of the Related Art

Installation of a digital monitoring system including a plurality of network cameras, a recording apparatus to record camera video images, and a viewer to play back live video images or recorded video images is proceeding at a rapid rate. Japanese Patent Application National Publication (Laid-Open) No. 2007-505523 discusses a method for enabling a corresponding event on a time line when a camera is specified to clarify the correspondence between a specific camera and an event. Also, a method for playing back recorded video images captured by the corresponding camera from the corresponding time when an event is specified is discussed. U.S. Pat. No. 6,144,375 discusses a method for configuring a three-dimensional model of scenes from video images taken from a plurality of cameras, establishing correspondences between events and video images, and displaying events for each object.

An event in which a person carrying an object appears during capturing of moving images and the person then goes away while leaving behind the object can be detected as a desertion detection event. Here, if a desertion detection event occurs, it is useful if the person who has brought in the deserted object can be checked. However, according to a conventional technique, in order to play back video images of an object related to an event, it is usual to sequentially specify related events after the relationship between the object and events is considered by the user. Also, according to a conventional technique, a window dedicated to the object is separately displayed to know correspondence relations between the object and events. Thus, it is difficult to intuitively understand the correspondence relations between the object and events.

SUMMARY OF THE INVENTION

According to an aspect of the present invention, an apparatus includes a recording unit configured to record a video image, an index generation unit configured to generate, when a first type of event in which a state of an object changes is detected from the video image, an index associating the first type and a second type of event related to the first type, and a playback unit configured to play back, when the first type in the video image is specified, a video image concerning the second type corresponding to the specified first type based on the index.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a diagram illustrating an example of event information.

FIG. 7 is a diagram illustrating an example of index information.

FIG. 15 is a flow chart illustrating an example of a processing procedure of one process by the playback apparatus.

DESCRIPTION OF THE EMBODIMENTS

Various exemplary embodiments, features, and aspects of the invention will be described in detail below with reference to the drawings.

In a first exemplary embodiment of the present invention, when an event concerning an object occurs, a playback apparatus for network cameras generates an index describing playback timing of events concerning an object related to the object. When, for example, a desertion detection event occurs, the playback apparatus generates an index describing the desertion detection event, an approximate time at which a person who has brought in a deserted object appears, and an approximate start time of desertion. Next, when a user specifies a symbol indicating a desertion detection event on a time line where symbols indicating events are displayed at positions of their occurrence times, the playback apparatus continuously plays back recorded video images based on an index including the desertion detection event. As a result, there is no need for the user of a network camera system (or a playback apparatus) in the present exemplary embodiment to search for related events and manually play back such related events, so that the user can immediately check important video images.

Figure 1:
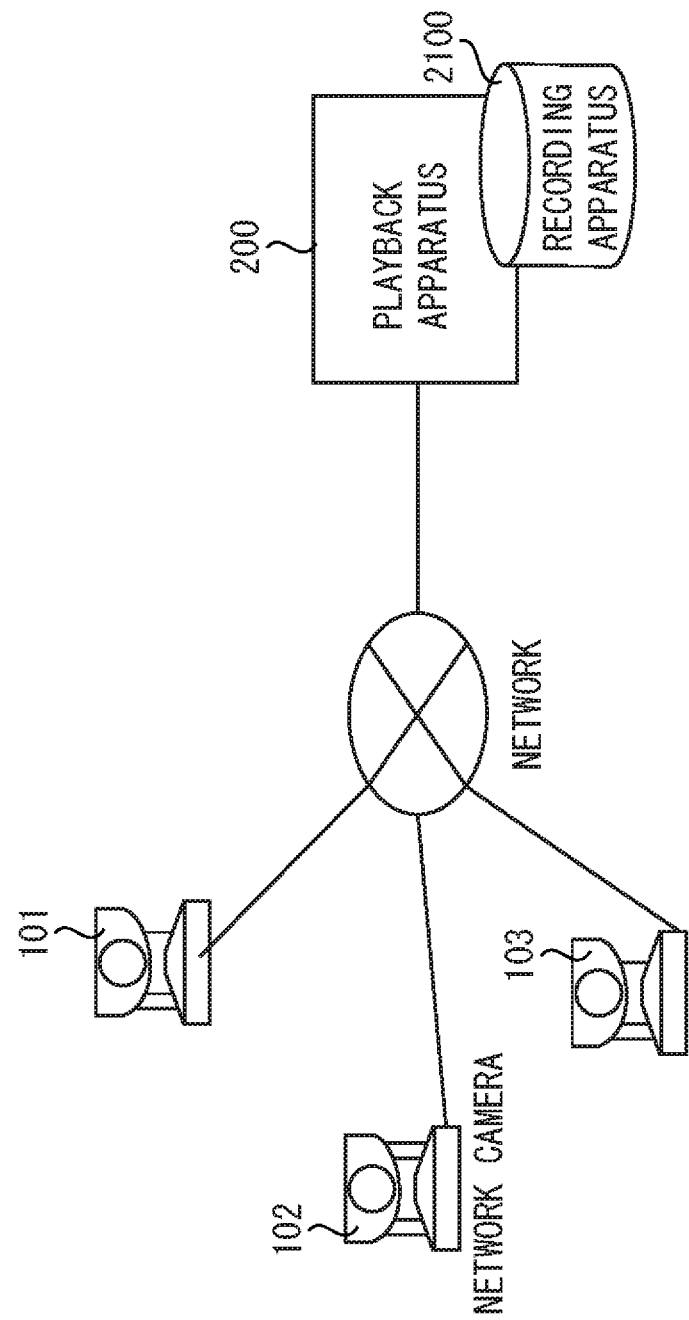
FIG. 1 is a diagram illustrating an example of a system configuration of a network camera system according to an exemplary embodiment of the present invention.

A system configuration of a typical network camera system in the present exemplary embodiment is illustrated in FIG. 1. In the network camera system, as illustrated in FIG. 1, a plurality of network cameras 101, 102, and 103 and a playback apparatus 200 including a recording apparatus 2100 are connected via a network. The network camera 101 has a function to transmit video images via the network, a motion detection function of video images, and a detection function of an object region in a video image.

The playback apparatus 200 has a function to acquire a video image from a network camera, a function to save the acquired video image in the recording apparatus 2100, a function to playback the received/saved video images, a motion detection function of video images, and a detection function of an object region in a video image.

These functions of the playback apparatus 200 are realized by programs stored in a read-only memory (ROM) 207 or a hard disk drive (HDD) 209 being executed by a central processing unit (CPU) 206.

Figure 2:
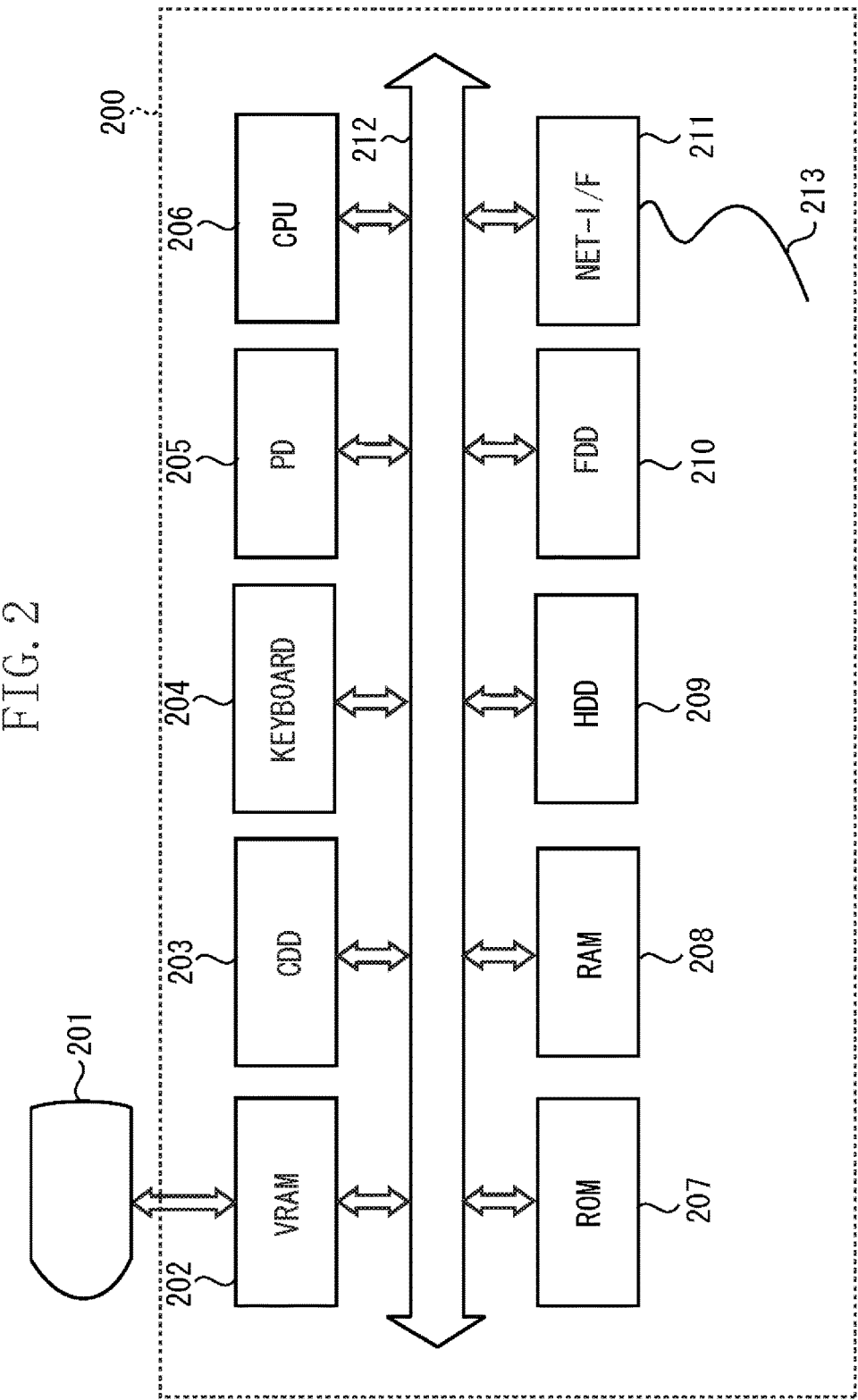
FIG. 2 is a diagram illustrating an example of a hardware configuration of a playback apparatus.

FIG. 2 is a diagram illustrating an example of the hardware configuration of the playback apparatus 200.

A display apparatus 201 displays, for example, windows, icons, messages, menus and other user interface information. A video random access memory (VRAM) 202 stores video images to be displayed on the display apparatus 201. The display apparatus 201 may be hardware constituting the playback apparatus 200 or an apparatus (hardware) that is connected to the playback apparatus 200 and different from the playback apparatus 200. In the example in FIG. 2, the display apparatus 201 is different from hardware constituting the playback apparatus 200.

Image data stored in the VRAM 202 is transferred to the display apparatus 201 according to predetermined rules and video images are thereby displayed on the display apparatus 201. A compact disk drive (CDD) 203 is an apparatus that reads/writes various control programs and data from/to recording media such as CD-ROM and CD-R. Instead of the CDD, a digital versatile disc (DVD) drive may be used.

A keyboard 204 has various keys to input characters. A pointing device (PD) 205 is used to point to icons, menus, or other objects displayed, for example, on a display screen of the display apparatus 201. The CPU 206 controls each device based on a control program stored in the ROM 207, the hard disk drive (HDD) 209, a flexible disk drive (FDD) 210, or an external storage apparatus (CDD) 203. As already described above, the functions of the playback apparatus 200 are realized by programs being executed by the CPU 206 of the playback apparatus 200.

The read-only memory (ROM) 207 stores various control programs and data. A random access memory (RAM) 208 has a work area for the CPU 206, a data save area during abnormality handling, a load area of control programs and the like.

The HDD 209 stores various control programs and various types of data. A network interface (Net-I/F) 211 performs communication with other information processing apparatuses, printers and the like via a network 213. A CPU bus 212 includes an address bus, a data bus, and a control bus. A control program can be provided to the CPU 206 from the ROM 207, the HDD 209, the FDD 210, or the CDD 203 or from other information processing apparatuses via the network 213.

The function of the recording apparatus 2100 can be realized by external storage apparatuses such as a hard disk drive being controlled by the CPU 206 inside the playback apparatus 200. The playback apparatus 200 performs communication with the network camera 101 via a network control unit to acquire video images, which are saved in the recording apparatus 2100. At this point, communication between the network camera 101 and the playback apparatus 200 is performed based on, for example, HyperText Transfer Protocol (HTTP), but the present exemplary embodiment is not limited to a specific protocol.

Here, the motion detection function of video images of the playback apparatus 200 calculates a quantity of motion in video images based on, for example, a difference between adjacent frames and, if the quantity of motion in video images exceeds a certain reference quantity, causes a motion detection event. The detection function of an object region in a video image of the playback apparatus 200 detects a region of a certain preset size or more obtained by performing region connection processing on, for example, a background difference image as an object region. In this case, a technique of improving detection accuracy by using knowledge about objects obtained from object region detection results in the past is generally used. The motion detection function of video images and the detection function of an object region may be provided on the network camera 101 side or the playback apparatus 200 side. In the present exemplary embodiment, techniques of motion detection and object region detection are not to be limited.

Figure 3:
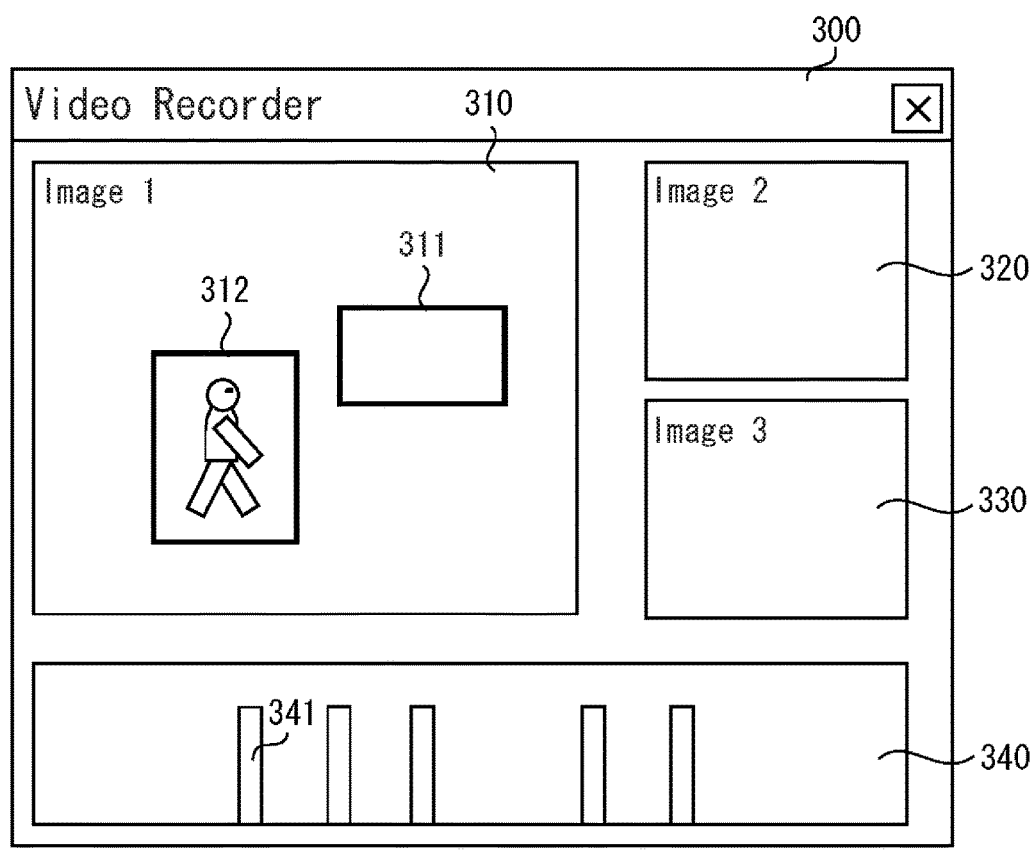
FIG. 3 is a diagram illustrating an example of a display screen.

Next, an example of the display screen of the playback apparatus 200 in the present exemplary embodiment will be described with reference to FIG. 3. FIG. 3 is a diagram illustrating an example of the display screen. FIG. 3 illustrates a window in the screen and the window includes a window frame 300, image display regions 310, 320, and 330, and a time line 340. Frames 311 and 312 indicating an object region are displayed in the image display region 310. In addition to the illustrated frame as a display example of the object region, representations of any shape such as a block and ellipse can be used. The time line 340 indicates recording states and occurrence times of events. More specifically, graphic symbols indicating events are arranged along the time axis in the time line 340.

The right end of the time line 340 indicates the current time and the playback apparatus 200 displays display events so that, with the passage of time, display events shift from right to left. If the user specifies the current time or a past time, recorded video images from the currently enabled camera are played back from the specified time. Events include the activation/stop of a system, the start/stop of recording, changes of the input state of an external sensor, changes of the motion detection state, the appearance/exit of an object, desertion, and taking away. In FIG. 3, while an event 341 is represented as a rectangular form, other forms than the rectangular form can also be represented.

Next, an example of event information in the present exemplary embodiment will be described with reference to FIG. 4. FIG. 4 is a diagram illustrating an example of event information. The playback apparatus 200 manages events by assigning IDs in order of occurrence time. Management content includes the occurrence date/time, type, priority, device ID, camera ID, object ID, and event details. The type is grouping and the details are a more concrete description of an event. For desertion detection, for example, the type is "abnormality detection" and the details are "standing-still detection". The device ID indicates an ID of a sensor or a camera device that became an event source. The priority is a priority concerning an event notification and the display color and the alarm notification to the user are set separately for each level of priority. The object ID is a serial number assigned to each detected object individually.

Figure 5:
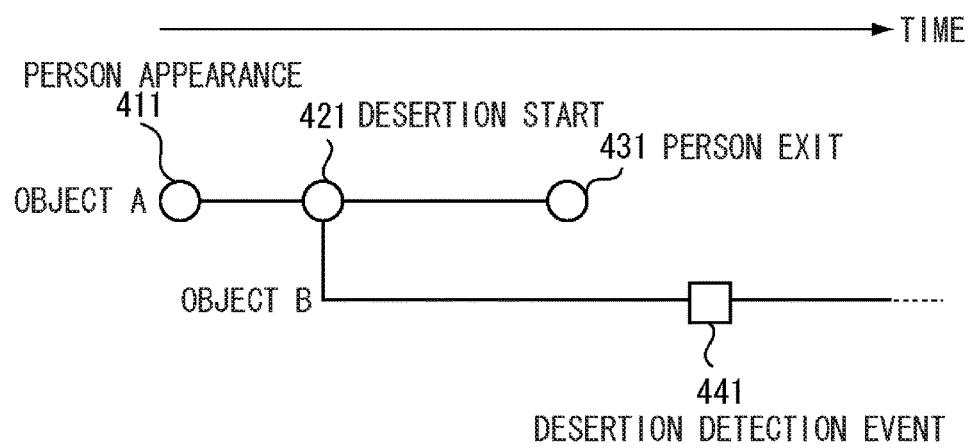
FIG. 5 is a diagram illustrating a presence time of objects and an event when desertion detection occurs.

Next, the method for generating an index in the present exemplary embodiment will be described. In the present exemplary embodiment, desertion detection is taken as an example. FIG. 5 is a diagram illustrating a presence time of objects and an event when desertion detection occurs. An object B is a bag and an object A is a person who carries the bag. The object A appears at time 411, leaves behind the object B at time 421, and exits at time 431. The object A appears at time 421 and is determined to be at rest for a predetermined time or longer by the playback apparatus 200 at time 441. As a result, a desertion detection event occurs at time 441. At this point, the object B is an object separated from the object A and thus, a relationship between the objects A and B is defined by the playback apparatus 200.

Separation and integration of objects become possible by analyzing motions of the objects. If, for example, a new object arises from the same position as an existing object immediately after the size of the existing object increases rapidly, the playback apparatus 200 can determine that the existing object has separated. If, on the other hand, two existing objects or more are present at the same position and the number of apparent objects is one for a predetermined time or longer thereafter, the playback apparatus 200 can determine that the existing objects have integrated.

Here, the playback apparatus 200 can improve detection accuracy of separation/integration of objects by using a human detection technique. The human detection technique is a technique to determine a human region or a position by using body features or face features in a video image. When the human detection technique is applied to separation of objects, a rule is set down that while a person can separate into a person and an object other than the person, a person cannot separate into a plurality of persons. Conversely, when the human detection technique is applied to integration of objects, a rule is set down that while a person and an object can be integrated into a person, a plurality of persons cannot be integrated into a person. Accordingly, an erroneous detection concerning separation/integration by an overlapping operation of persons in the playback apparatus 200 can be reduced.

Figure 6:
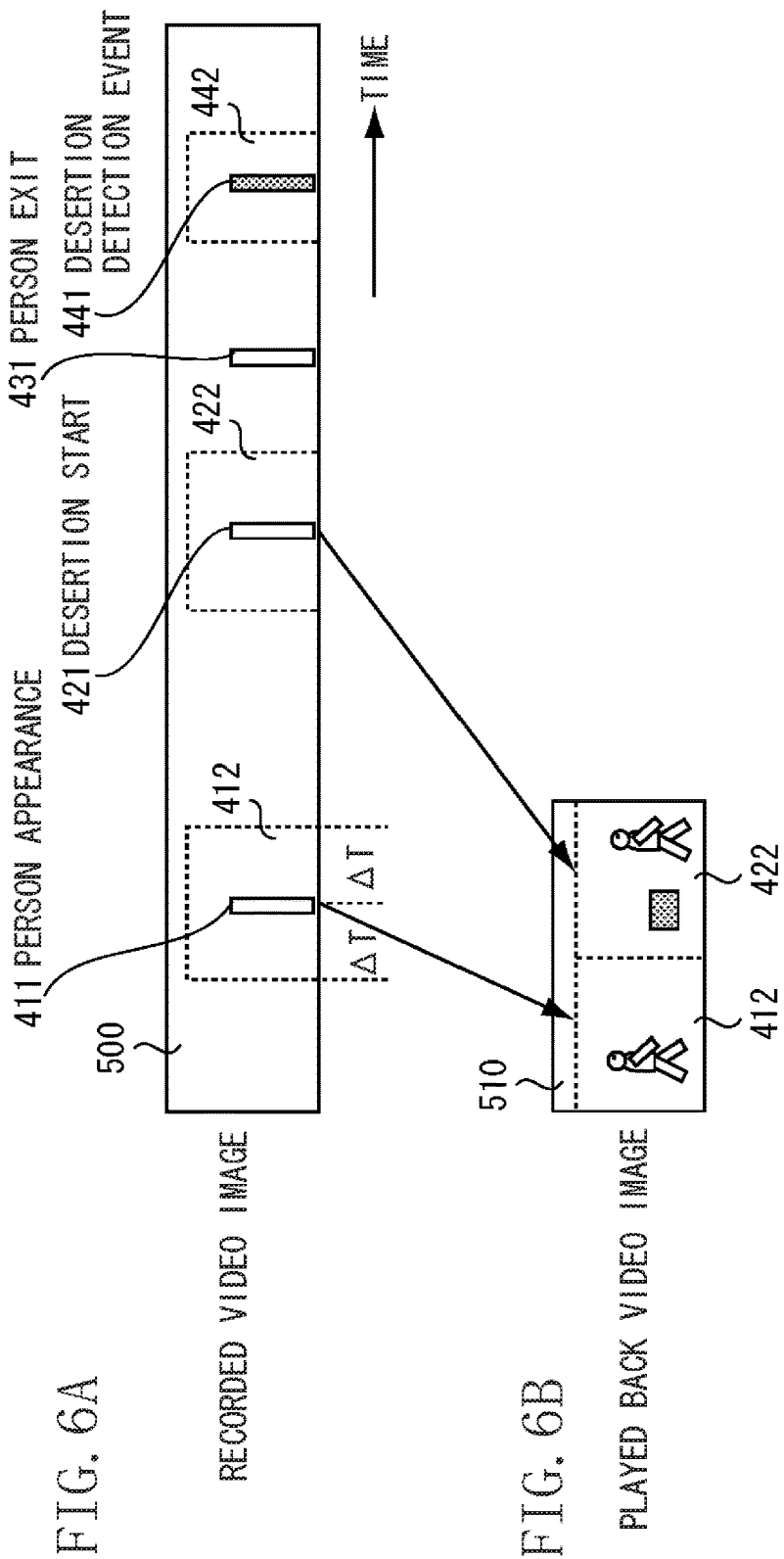
FIGS. 6A and 6B are diagrams illustrating an example of generation of an index by extracting video images before and after events related to the desertion detection.

Next, the generation method of an index when a desertion detection occurs will be described with reference to FIGS. 6A and 6B. FIGS. 6A and 6B are diagrams illustrating an example of generation of an index by extracting video images before and after events related to the desertion detection. FIG. 6A illustrates recorded video images. FIG. 6B is an example of played back video images based on the index. In FIG. 6A, the respective events at the time 411 of the appearance of a person, the time 421 of the start of desertion, the time 431 of the exit of the person, and the time 441 of the detection of desertion described with reference to FIG. 5 are illustrated in the recorded video images 500.

When a desertion detection event 442 occurs, what the user wants to know is a person who has left behind the deserted object and the moment of the desertion. Thus, as illustrated in FIG. 6B, the playback apparatus 200 plays back video images before and after the time 411 of the appearance of a person and the time 421 of the start of desertion continuously. If the playback time before or after an event is set as ΔT, video images 510 of the duration time 4ΔT will be played back by the playback apparatus 200. Here, video images before and after the desertion detection event 442 are changeless video images and thus, the playback apparatus 200 omits the playback thereof. The playback time before or after an event is not limited to ΔT and may be set optionally for each event.

An example of information stored as an index is illustrated in FIG. 7. FIG. 7 is a diagram illustrating an example of index information stored by the playback apparatus 200 as an index. As illustrated in FIG. 7, index information includes three types of information: attention event information, related event information, and operation information. The attention event information is an event that causes generation of an index and is, for example, the desertion detection event in FIG. 5. An event ID of the event is stored as the attention event information. The related event information is, for example, the time 421 of the appearance of an object corresponding to the attention event information or the time 411 of the appearance of a separation source object of the object. The event ID of the event is stored as the related event information. However, a comment illustrated in FIG. 7 is not necessarily needed. The operation information is a list of the start time and stop time of the playback. More specifically, the operation information includes operation content such as the start and end, camera ID, time, and related event IDs. As already described above, the playback time and stop time are determined by the playback apparatus 200 depending on the occurrence times of related events.

Various techniques can be used for how to represent event information in FIG. 4 or the index in FIG. 7. For example, the event information or the index can be represented in a list form of a structure in a program or saved in a file or transmitted in the XML form.

The user causes the playback apparatus 200 to play back video images by specifying a desertion detection event on the time line 340. Methods for specifying an event include double-clicking and a method for using a context menu, but the present exemplary embodiment does not limit the method thereof.

Figure 8:
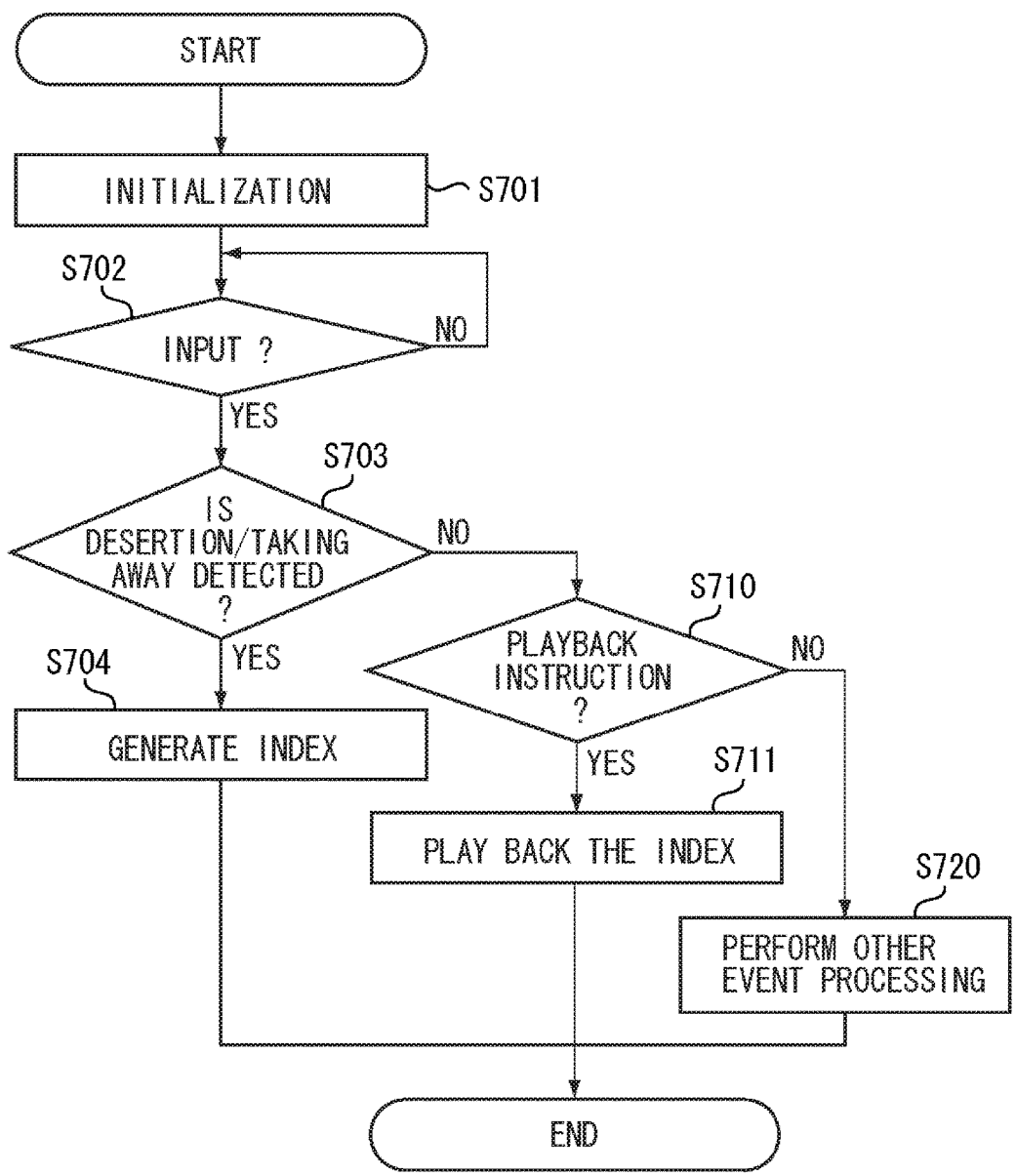
FIG. 8 is a flow chart illustrating an example of a processing procedure for one process by the playback apparatus.

Next, the processing procedure for one process by the playback apparatus 200 in the present exemplary embodiment will be described with reference to FIG. 8. FIG. 8 is a flow chart illustrating an example of a processing procedure for one process by the playback apparatus 200. The process is a process of the graphical user interface (GUI) and more specifically an event processing process. For simplification of description, only events directly related to the present exemplary embodiment are illustrated. As already described above, an event processing process is executed by a program being executed by the CPU 206.

In step S701, the CPU 206 performs initialization. In step S702, the CPU 206 waits for an operational input from the user. When an operation event occurs (YES in step S702), then in step S703, the CPU 206 determines whether the event is a desertion/taking away detection event. If the operation event is a desertion/taking away detection event (YES in step S703), then in step S704, the CPU 206 generates an index according to the technique described above.

If the operation event is other than a desertion/taking away detection event in step S703 (NO in step S703), then in step S710, the CPU 206 determines whether the detection event is a playback instruction input. The playback instruction input is generated as a result of an event on the time line being designated. If the detection event is the playback instruction input (YES in step S710), then in step S711, the CPU 206 plays back the index of recorded video images related to the designated event. If the detection event is not the playback instruction input (NO in step S710), then in step S720, the CPU 206 performs other event processing before returning.

According to the processing described above, when an event concerning an object occurs, the playback apparatus 200 generates an index of video images of other objects related to the object and plays back video images according to the designation. More specifically, when a desertion detection event occurs, the playback apparatus 200 generates an index capturing moments of the appearance of a person who has brought in a deserted object and the desertion of the object and plays back related recorded video images based on the index according to the designation of an event on the time line.

Next, a second exemplary embodiment of the present invention will be described. There is a method for generating a video index when an event concerning an object occurs after waiting until all objects related to the object exit. This method is effective if the index should include, when, for example, a taking away detection event occurs, up to the exit of a person who has taken away an object from the screen. On the other hand, a delay may arise between the time when the taking away detection event occurs and the time when an index is generated and video images are played back.

The system configuration of the present exemplary embodiment is similar to that of the first exemplary embodiment and thus, a description thereof will not be repeated and the description below focuses on different portions from the first exemplary embodiment. The method for generating an index is illustrated in FIGS. 9 and 10.

Figure 9:
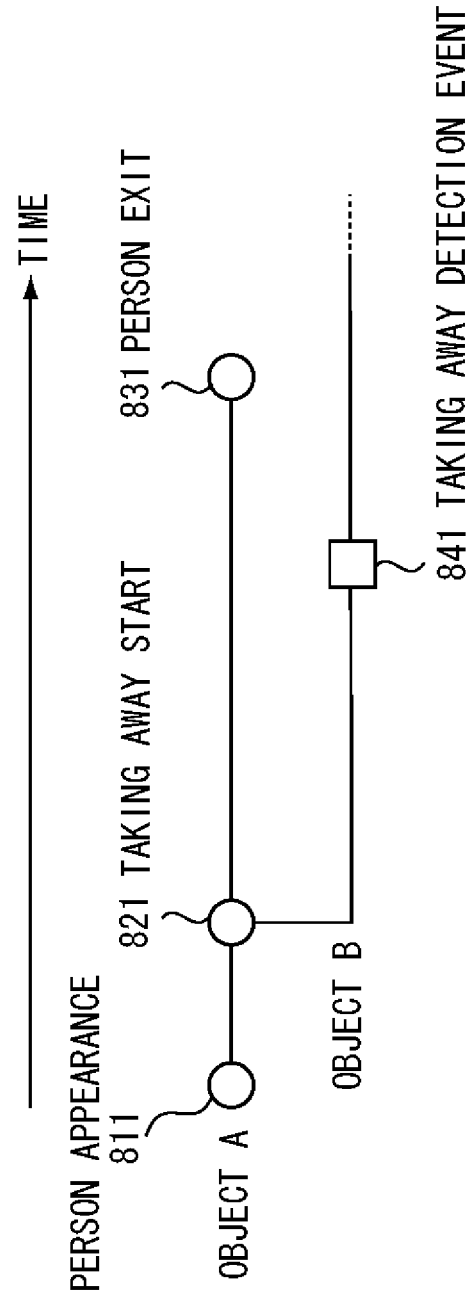
FIG. 9 is a diagram illustrating a presence time of objects and events when taking away detection occurs.
Figure 10:
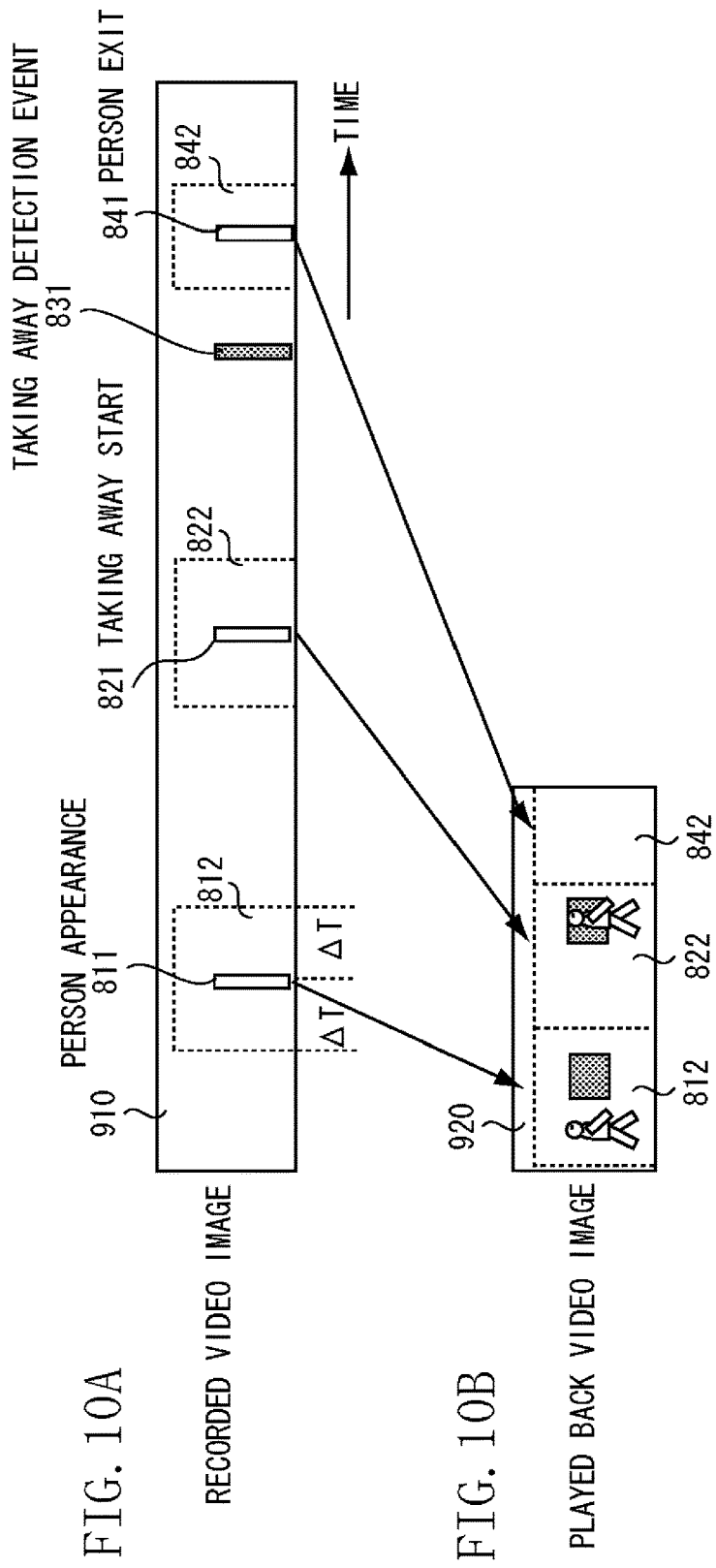
FIGS. 10A and 10B are diagrams illustrating an example of generation of an index by extracting video images before and after events related to the taking away detection.

FIG. 9 is a diagram illustrating the presence time of objects and events when taking away detection occurs. An object A is a person and an object B is a background region that appears after taking away occurs. The object B is the background region that newly appears after taking away occurs because when object region extraction using background differences is used, the playback apparatus 200 stores scenes before taking away occurs as a background and thus, a region such as a wall that appears after the taking away is first determined to be a new object region. Events concerning the objects A include an appearance of a person 811, a start of taking away 821, and an exit 831. The object B appears after being separated from the object A at detection time of the start of taking away 821, and a taking away detection event 841 occurs because the object B is in a resting state for a predetermined time or longer. FIG. 9 is different from FIG. 5 in that an event of the exit 831 of the taking-away person occurs after the taking away detection event 841 occurs. Here, the playback apparatus 200 can measure the fact that the object B has separated from the object A by using an identification unit or method like the one described in the first exemplary embodiment.

FIGS. 10A and 10B are diagrams illustrating an example of the generation of the index by extracting video images before and after events related to the taking away detection. FIG. 10A illustrates recorded video images from the appearance of the object A to the exit of the object B and events. FIG. 10B illustrates played back video images. In FIG. 10A, the recorded video images 910 include the appearance of a person 811, the start of taking away 821, confirmation of the taking away detection (the exit 831 of the taking-away person), and the event of exit of the person (the taking away detection event 841). When the taking away detection occurs, it is necessary for the user to verify a taking-away act. For this purpose, the appearance of a person who has taken away an object, the moment of taking away the object, and the exit while carrying the object are important moments.

Thus, as illustrate in FIG. 10B, the playback apparatus 200 in the present exemplary embodiment generates an index storing times of ΔT before or after the appearance of a person 811, the start of taking away 821, and the exit of the person 842. As a result, video images 920 of the duration time 6ΔT will be played back. Like the first exemplary embodiment, the playback time ΔT before or after an event may be set optionally for each event.

Figure 11:
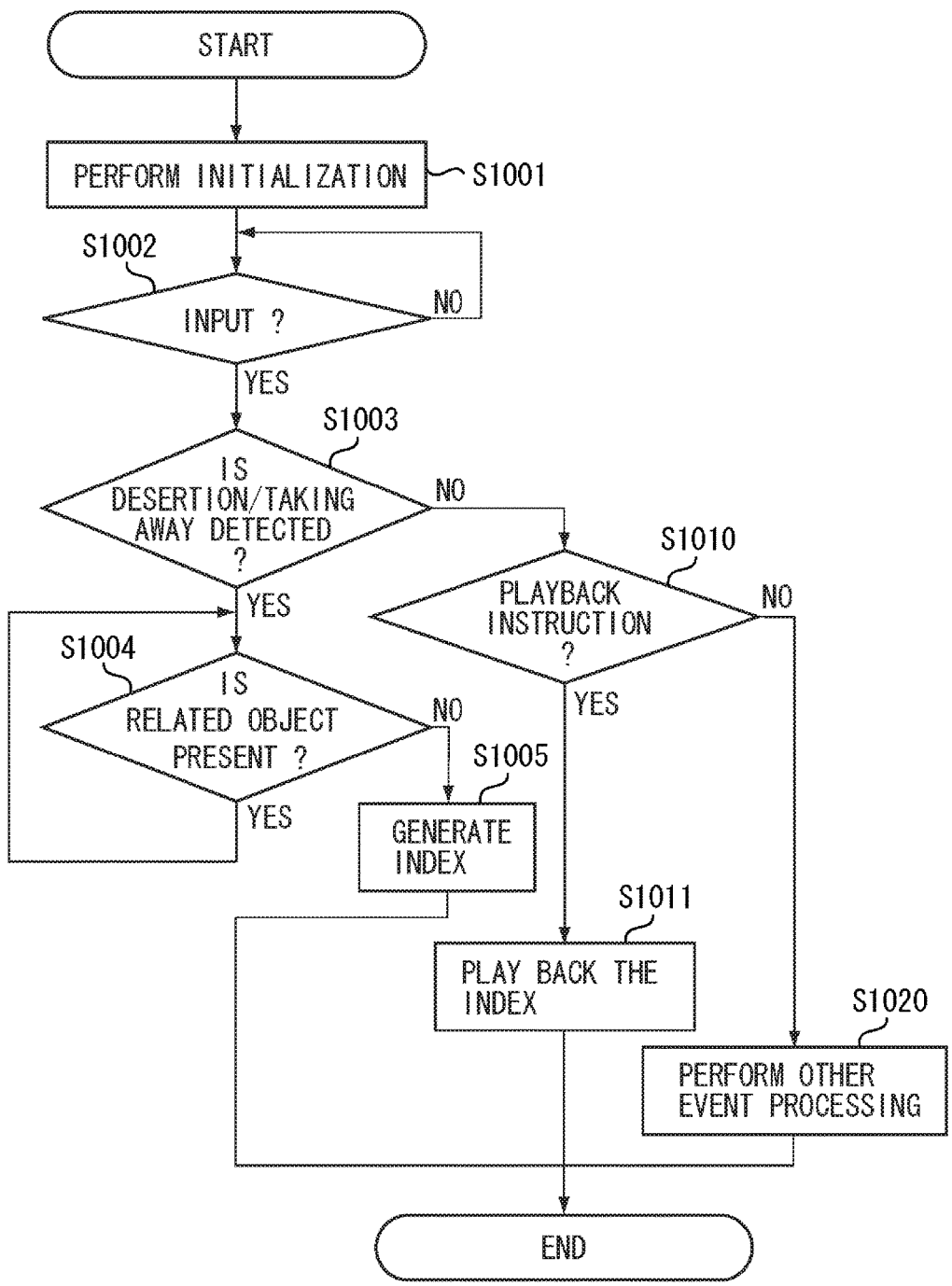
FIG. 11 is a flow chart illustrating an example of a processing procedure of one process by the playback apparatus.

Next, the processing procedure for one process by the playback apparatus 200 in the present exemplary embodiment will be described with reference to FIG. 11. FIG. 11 is a flow chart illustrating an example of the processing procedure of one process by the playback apparatus 200. This process is a process concerning the GUI and more specifically, an event processing process. Like FIG. 8, for simplification of description, only events directly related to the present exemplary embodiment are illustrated. A different portion from FIG. 8 will be described.

In step S1003, the CPU 206 determines whether the event is a desertion/taking away detection event. If the event is a desertion/taking away detection event (YES in step S1003), then in step S1004, the CPU 206 determines whether any related object is present in video images. This is because of waiting until all related objects exit. If any related object is present in video images (YES in step S1004), the CPU 206 continues processing. If there is no related object (NO in step S1004), then in step S1005, the CPU 206 generates a video index. If the operation event is other than a desertion/taking away detection event (NO in step S1003), then in step S1010, the CPU 206 determines whether the detection event is a playback instruction input. This occurs as a result of an event on the time line being designated. If the detection event is the playback instruction input (YES in step S1010), then in step S1011, the CPU 206 plays back recorded video images according to the index. If the detection event is not the playback instruction input (NO in step S1010), then in step S1020, the CPU 206 performs other event processing before returning.

According to the processing described above, when an event occurs, a video index in which only important scenes are edited is generated after waiting until related objects exit. More specifically, when a taking away detection event occurs, an index including the entry of a person who would take a taking-away act, the moment of taking away, and up to the exit of the person who has taken a taking-away act is generated to play back video images.

In a third exemplary embodiment of the present invention, processing to make a correspondence relation between the object region display and the event display on a time line intuitively understandable in a monitoring system having the time line will be described.

Figure 12:
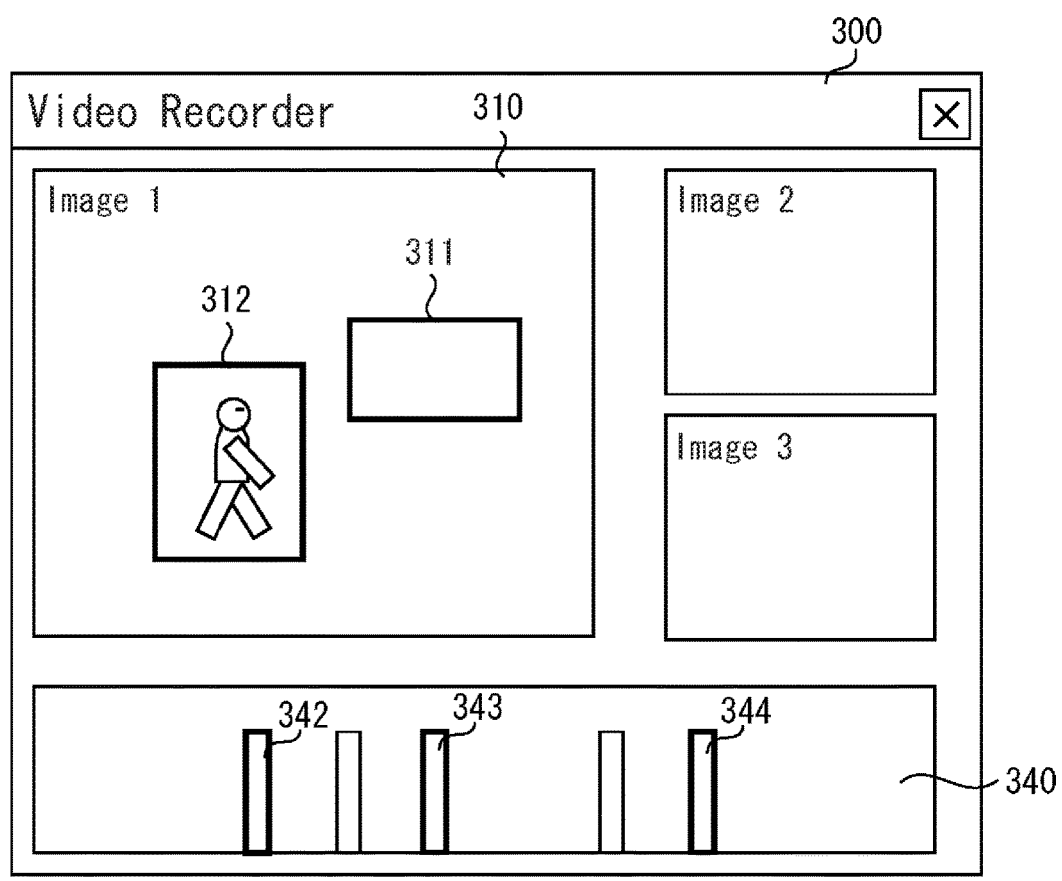
FIG. 12 is a diagram illustrating an example of a correspondence relation between an object region display and an event display on a time line.

The method for indicating a correspondence relation between the object region display and the event display on the time line in the present exemplary embodiment will be described with reference to FIG. 12. FIG. 12 is a diagram illustrating an example of a correspondence relation between the object region display and the event display on the time line. In FIG. 12, an image display region 310 and a frame 312 indicating an object region in a camera are in a selected state. This state occurs by the frame 312 indicating an object region being clicked using a mouse pointer by a user. At this point, events of the object related to the frame 312 are highlighted on the time line. Events of an object are, for example, the appearance and exit of the object. In the event information illustrated in FIG. 4, the playback apparatus 200 can identify correspondence relations based on the same object ID. At this point, the playback apparatus 200 can make correspondences between objects and events clear by highlighting, like the frame 312 indicating an object region, the frame 312 indicating an object region and events 342, 343, and 344 related to the object. More specifically, the playback apparatus 200 uniforms the frame thickness, line type, color, and the like. Accordingly, the user can easily identify only events corresponding to a specified object from among many events on the time line.

The playback apparatus 200 can change the color of the frame 312 indicating an object region in a video image and the display of the event 342 on the time line according to changes in attributes of the object. Assume, for example, that the display of the event 342 is an appearance event of the object. Here, a desertion detection event is defined as an event and it is assumed that when the object is in a stopped state for a predetermined time or longer, the event is generated. In such a case, the playback apparatus 200 can indicate that an occurrence of the event is approaching by changing the color of the frame 312 like blue-green-yellow-red according to a stop time of the object. In this case, by also changing the color of the display of the event 342 on the time line 340 in conjunction with the frame 312 indicating an object region, the playback apparatus 200 can maintain the correspondence relation. The playback apparatus 200 indicates the correspondence relation between an object and the event display and can also indicate stop time information of the object only by the event display on the time line.

The playback apparatus 200 in the present exemplary embodiment highlights, when an event is specified, events concerning the same object and can also highlight corresponding video images and the object display. This means that if the user selects the display of, for example, the event 342, the playback apparatus 200 highlights the display of the events 342, 343, and 344 concerning the same object and also highlights the corresponding image display region 310 and the frame 312 indicating the object region. If the user specifies the display of the event 342 by double-clicking the mouse in this state, the playback apparatus 200 starts the playback of video images of the corresponding time.

Figure 13:
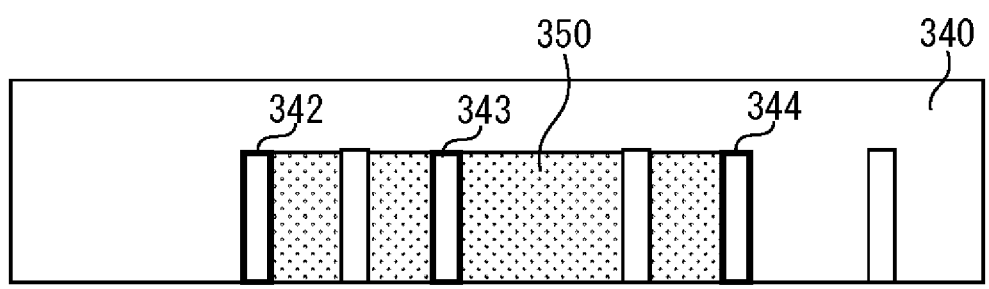
FIG. 13 is a diagram illustrating another example emphasizing events concerning the same object on the time line.

Another example of emphasizing events concerning the same object on the time line is illustrated in FIG. 13. FIG. 13 is a diagram illustrating another example emphasizing events concerning the same object on the time line. In FIG. 13, like the time line in FIG. 12, the playback apparatus 200 highlights events concerning the same object and further colors a background 350 between an appearance event of an object and an exit event separately from the normal background. The playback apparatus 200 may display, as illustrated in FIG. 13, events concerning other objects than the object selected by the user simultaneously or keep such events hidden behind.

Incidentally, the playback apparatus 200 can establish correspondence relations between the object display and the event display even if there is a plurality of cameras. In other words, the playback apparatus 200 displays the object so as to make clear all the correspondence relations between the object and the event among the plurality of cameras, if the same object is taken by the plurality of cameras disposed at different positions.

Figure 14:
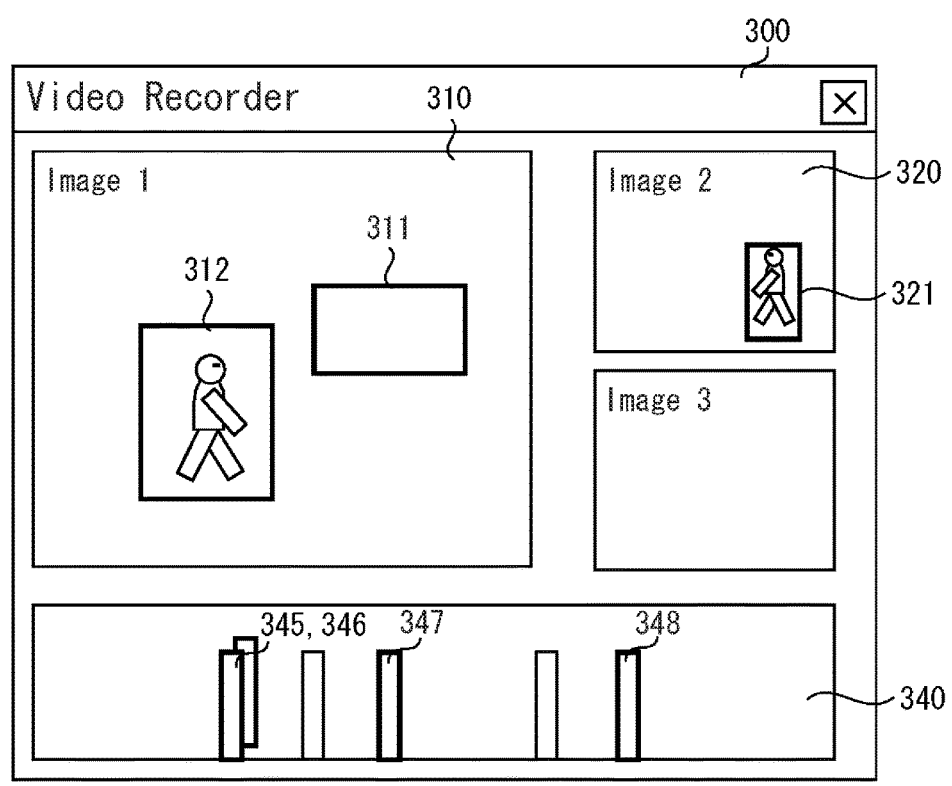
FIG. 14 is a diagram illustrating an example of a screen of a recording application when objects and events among a plurality of cameras are displayed by establishing correspondences therebetween.

FIG. 14 is a diagram illustrating an example of the screen of a recording application when objects and events among a plurality of cameras are displayed by establishing correspondences therebetween. In FIG. 14, it is assumed that the frame 312 indicating an object region present in the image display region 310 and an object 321 present in the camera video image 320 are the same object. In FIG. 14, there is a plurality of methods for the playback apparatus 200 to determine whether objects in a plurality of camera video images are the same object. If there are events of the same type occurring at the same time in a plurality of video images, the events can be considered to concern the same object. This means that if desertion detection occurs at the same time in different video images, the playback apparatus 200 considers the objects to be the same. A method for verifying the identity of objects in scenes by the playback apparatus 200 based on the physical relationship of a plurality of cameras is known as another method.

If the user selects the frame 312 indicating an object region in the image display region 310 of the network camera 101, the frame 312 is highlighted by the playback apparatus 200. At the same time, event information is referenced by the playback apparatus 200 to highlight events 345, 347, and 348 related to the object on the time line 340. Next, the playback apparatus 200 checks whether there is any applicable event concerning the same object and, if there is any, highlights such an event. In FIG. 14, an event 346 is highlighted. It is assumed here that a rule that events of the same type occurring at the same time are considered to concern the same object is used. In the example in FIG. 14, desertion detection events occur at the same time in the image display region 310 of the network camera 101 and the camera video image 320 of the camera 102. To show that desertion detection events has occurred at the same time, the playback apparatus 200 displays a plurality of events by shifting the position. Further, the playback apparatus 200 highlights the object 321 corresponding to the event 346 in the same manner. With the above processing, the playback apparatus 200 can display the same object 321 in video images different from events related to the frame 312 indicating an object region by establishing a correspondence therebetween.

At this point, the playback apparatus 200 also adds correspondences between objects to the event management in FIG. 4. For example, the playback apparatus 200 considers a standing-still detection ON event (for example, the device ID: Cam02, object ID: 003) that has occurred in a different camera at the same time as a standing-still detection ON event (event ID: 00128, device ID: Cam01, object ID: 002) in FIG. 4 as events concerning the same object. Then, the playback apparatus 200 stores the object ID: 002 and the object ID: 003 as the same object.

Next, the processing procedure for one process by the playback apparatus 200 in the present exemplary embodiment will be described with reference to FIG. 15. FIG. 15 is a flow chart illustrating an example of the processing procedure of one process by the playback apparatus 200. This process is a process concerning the GUI and more specifically, an event processing process. Like FIGS. 8 and 11, for simplification of description, only events directly related to the present exemplary embodiment are illustrated.

In step S1400, the CPU 206 initializes the display. In step S1401, the CPU 206 waits for an event. Next, in step S1402, the CPU 206 determines whether any video frame is specified. This determines whether a specific camera video frame is specified by the user using a mouse pointer. If a video frame is specified (YES in step S1402), the processing proceeds to step S1404. In step S1404, the CPU 206 highlights the specified frame and, then in step S1405, highlights events related to the specified camera.

If the event is not an event to specify a video frame (NO in step S1402), then in step S1410, the CPU 206 determines whether the event is an event to specify an object. If the event is an event to specify an object (YES in step S14102), then in step S1411, the CPU 206 detects the specified range. This is because a plurality of objects may be specified. Next, in step S1412, the CPU 206 highlights events concerning the same object. In step S1413, the CPU 206 highlights objects related to the specified event. If the event is not an event to specify an object (NO in step S1410), then in step S1420, the CPU 206 determines whether the event is an event to specify an event. If the event is an event to specify an event (YES in step S1420), then in step S1421, the CPU 206 detects the specified range. This is because a plurality of events may be specified. In step S1422, the CPU 206 highlights events concerning the same object. In step S1423, the CPU 206 highlights objects related to the specified event. If the event is not an event to specify an event (NO in step S1420), then in step S1430, the CPU 206 performs other event processing.

According to the present exemplary embodiment, as described above, correspondence relations between objects and events can be made clear by uniforming a highlighting method of the object display in video images and the event display on the time line. Also according to the present exemplary embodiment, a display method that makes correspondences between objects and events in a plurality of camera video images easily understandable can be realized for an event display form in which all events occurring in different camera video images are displayed on one time line.

According to each of the above exemplary embodiments, when an event occurs, the playback apparatus 200 plays back short video images including before and after the appearance time of a parent object of an object related to the event and the time when the object separates from the parent object. Accordingly, a user can check video images most desired to know concerning the event. Moreover, with only events corresponding to the object specified by the user being highlighted by the playback apparatus 200, correspondence relations between the object display in a plurality of video images and the event display on the time line becomes clear. Further, changes in object attributes can be known on the time line by both the object display and the event display being changed by the playback apparatus 200 according to changes in object attributes.

Therefore, when an event concerning an object occurs, suitable video images concerning objects related to the object can swiftly be played back.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
   a recording unit configured to record a video image;
   a detection unit configured to detect an event in which a state of an object changes from the video image;
   a generation unit configured to generate, when a first type event and one or more second type event related to the first type event are detected from the video image, an index associating the first type event and the one or more second type event;
   a display unit configured to display a time line on which a plurality of symbols indicating respective events are arranged, wherein a symbol indicating each of the events is arranged in a position corresponding to a time when each of the events occurred;
   a specifying unit configured to specify an event in response to a selection of a symbol indicating the event by a user;
   an identification unit configured to identify, when the event of the first type is specified, one or more second type event related to the specified first type event based on the index; and
   a playback unit configured to play back a video image concerning the identified one or more second type event.

2. The apparatus according to claim 1, wherein the detection unit is configured to detect desertion or taking away of an object as the event.

3. The apparatus according to claim 1, wherein the display control unit is configured to change, when a symbol corresponding to an object event is selected from the time line, display forms of symbols indicating object events related to an object which is a subject of the object event corresponding to the selected symbol so as to be distinguishable from other object events on the time line.

4. The apparatus according to claim 1, wherein the playback unit is configured to start, in response to the selection of the symbol, the playback of the video image.

5. The apparatus according to claim 1, wherein the display unit is configured to change a display form of a symbol indicating the specified event.

6. The apparatus according to claim 1, wherein the display unit is configured to change a display form of a symbol indicating the identified event.

7. A method comprising:
   recording a video image;
   detecting an event in which a state of an object changes from the video image;
   generating, when the object of event is detected from the video image, event information associating the object event with an identifier of the object and a time when the object event occurred;
   generating, when a first type event and one or more second type event related to the first type event are detected from the video image, an index associating the first type event and the one or more second type event;
   displaying a time line on which a plurality of symbols indicating respective events are arranged, wherein a symbol indicating each of the events is arranged in a position corresponding to a time when each of the events occurred;
   specifying an event in response to a selection of a symbol indicating the event by a user;
   identifying, when the event of the first type is specified, one or more second type event related to the specified first type event based on the index; and
   playing back a video image concerning the identified one or more second type event.

8. The method according to claim 7, wherein the detecting includes detecting desertion or taking away of an object as the event.

9. The method according to claim 7, wherein the displaying includes changing, when a symbol corresponding to an object event is selected from the time line, display forms of symbols indicating object events related to an object which is a subject of the object event corresponding to the selected symbol so as to be distinguishable from other object events on the time line.

10. The method according to claim 7, wherein the playing back includes starting, in response to the selection of the symbol, the playback of the video image.

11. The method according to claim 7, wherein the displaying includes changing a display form of a symbol indicating the specified event.

12. The method according to claim 7, wherein the displaying includes changing a display form of a symbol indicating the identified event.

13. A non-transitory computer-readable storage medium storing a program for causing a computer to execute a method comprising:
　recording a video image;
　detecting an event in which a state of an object changes from the video image;
　generating, when the object of event is detected from the video image, event information associating the object event with an identifier of the object and a time when the object event occurred;
　generating, when a first type event and one or more second type event related to the first type event are detected from the video image, an index associating the first type event and the one or more second type event;
　displaying a time line on which a plurality of symbols indicating respective events are arranged, wherein a symbol indicating each of the events is arranged in a position corresponding to a time when each of the events occurred;
　specifying an event in response to a selection of a symbol indicating the event by a user;
　identifying, when the event of the first type is specified, one or more second type event related to the specified first type event based on the index; and
　playing back a video image concerning the identified one or more second type event.

14. The non-transitory computer-readable storage medium according to claim 13, wherein the detecting includes detecting desertion or taking away of an object as the event.

15. The non-transitory computer-readable storage medium according to claim 13, wherein the displaying includes changing, when a symbol corresponding to an object event is selected from the time line, display forms of symbols indicating object events related to an object which is a subject of the object event corresponding to the selected symbol so as to be distinguishable from other object events on the time line.

16. The non-transitory computer-readable storage medium according to claim 13, wherein the playing back includes starting, in response to the selection of the symbol, the playback of the video image.

17. The non-transitory computer-readable storage medium according to claim 13, wherein the displaying includes changing a display form of a symbol indicating the specified event.

18. The non-transitory computer-readable storage medium according to claim 13, wherein the displaying includes changing a display form of a symbol indicating the identified event.

* * * * *